United States Patent [19]  
Martin

[11] Patent Number: 4,492,899  
[45] Date of Patent: Jan. 8, 1985

[54] SOLID STATE REGULATED POWER SUPPLY SYSTEM FOR COLD CATHODE LUMINOUS TUBE

[75] Inventor: Marshal H. Martin, Northridge, Calif.

[73] Assignee: Indicator Controls Corporation, Gardena, Calif.

[21] Appl. No.: 497,185

[22] Filed: May 23, 1983

Related U.S. Application Data

[63] Continuation-in-part of Ser. No. 293,018, Aug. 18, 1981, abandoned.

[51] Int. Cl.$^3$ .......................... G05F 1/00; H05B 37/02
[52] U.S. Cl. .................... 315/308; 315/219; 315/224; 315/309; 315/DIG. 7
[58] Field of Search ................. 315/219, 224, DIG. 7, 315/308, 309

[56]  References Cited

U.S. PATENT DOCUMENTS 3,889,153  6/1975  Pierce ........................ 315/DIG. 7
4,060,752  11/1977  Walker ........................... 315/224
4,251,752  2/1981  Stolz ............................. 315/219
4,356,433  10/1982  Linden ........................... 315/308
4,414,493  11/1983  Henrich ......................... 315/308

Primary Examiner—Harold Dixon
Attorney, Agent, or Firm—Keith D. Beecher

[57]  ABSTRACT

A solid state power supply and light emission controller for a cold cathode luminous tube which converts standard alternating current line voltage, or direct current voltage, into a variable repetition rate pulse alternating current voltage for energizing the tube and for controlling the light emission thereof. The power supply and controller provides for essentially constant light emission from the tube in the presence of variations in the load presented by the tube, ambient temperature and line voltage. The power supply and controller includes a flyback transformer circuit which, in turn, includes circuitry for monitoring the line voltage and the load presented by the tube, and for providing an automatic cut-off when the line voltage decreases below a predetermined level. The power supply and controller finds use, for example, with cold cathode luminescent tubes such as fluorescent-mercury-argon-neon, fluorescent neon, clear mercury-argon-neon, and clear neon.

9 Claims, 4 Drawing Figures

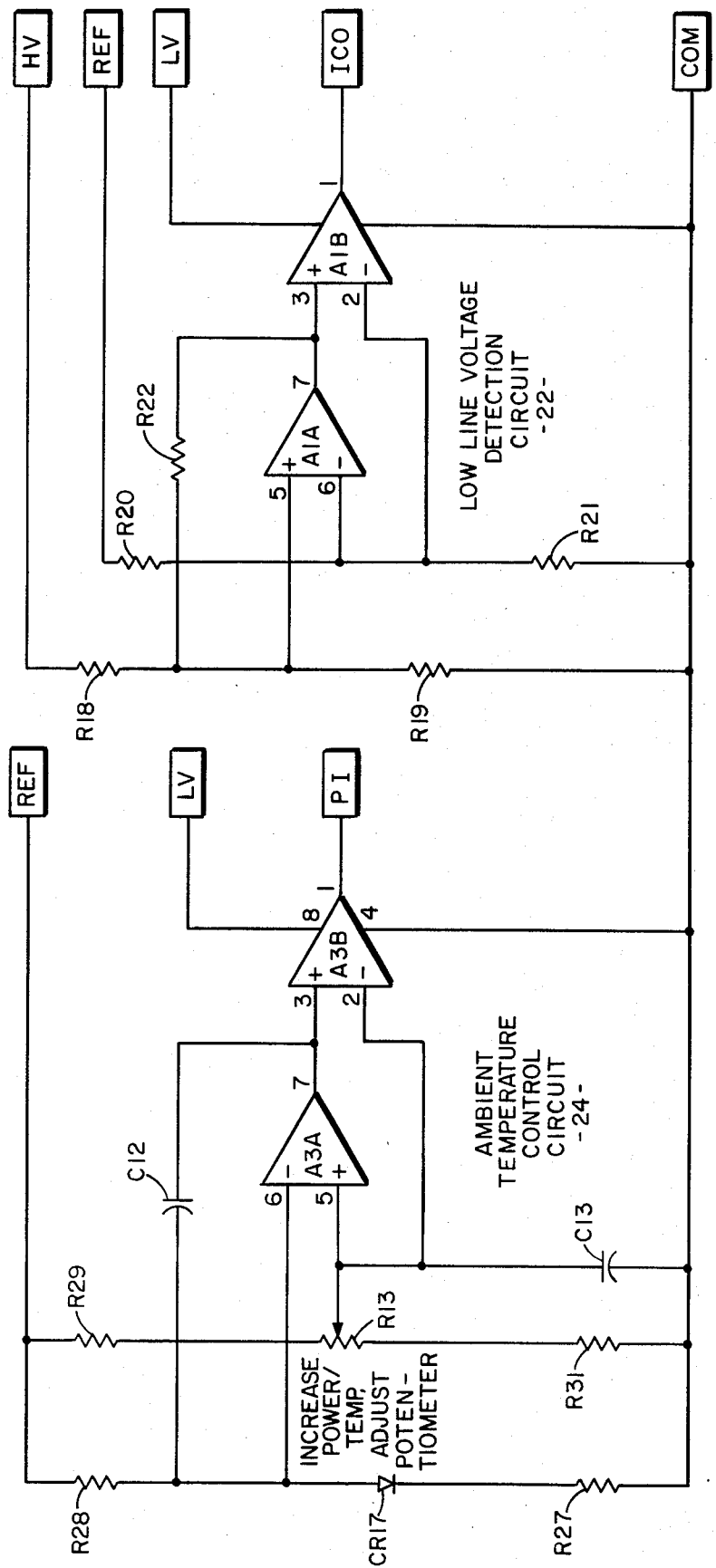
FIG. IC

SOLID STATE REGULATED POWER SUPPLY SYSTEM FOR COLD CATHODE LUMINOUS TUBE

This application is a continuation-in-part of copending application Ser. No. 293,018 filed Aug. 18, 1981 and now abandoned.

BACKGROUND OF THE INVENTION

The power supply and light emission controller of the invention is intended to replace the usual relatively heavy, costly and inefficient transformer power supplies used in the prior art to energize cold cathode luminous tubes; and the power supply and controller of the invention also serves to improve the light emission characteristics of such luminous tubes. For example, a power supply and light emission controller constructed in accordance with the concepts of the present invention may be built with a weight of less than one-third the weight of an equivalent prior art transformer power supply, approximately two-thirds the size of the prior art transformer power supply, and at a lower cost than the prior art transformer power supply.

Specifically, as compared with the prior art transformer power supply, a power saving of the order of 35% may be achieved by the solid state power supply and light emission controller of the present invention, and a weight saving of the order of 85% may be achieved. In addition, and as noted above, a cost saving may be realized and improved reliability may be achieved. The solid state power supply and light emission controller of the invention also exhibits an improved power factor as compared with the prior art transformer power supply, in that the power factor of the present invention is nearly unity or slightly leading, whereas the power factor of the prior art transformer power supply is lagging.

As described briefly above, the solid state power supply and light emission controller of the invention provides a regulated light output in the presence of variations in line voltage and ambient temperature. The power supply of the invention, as mentioned above, may be used with alternating current as well as with direct current voltage sources.

Specifically, the solid state power supply and light emission controller of the present invention has an efficiency factor of the order of 80%, and it can regulate the light emission from a cold cathode luminous tube over a variation in line voltage from 90-150 volts, and through variations in line frequency from 40 Hz-500 Hz.

BRIEF DESCRIPTION OF THE DRAWINGS

FIGS. 1A-1D comprise a circuit diagram of a solid state power supply and light emission controller incorporating the concepts of the present invention.

DETAILED DESCRIPTION OF THE ILLUSTRATED EMBODIMENT

Figure 1A:
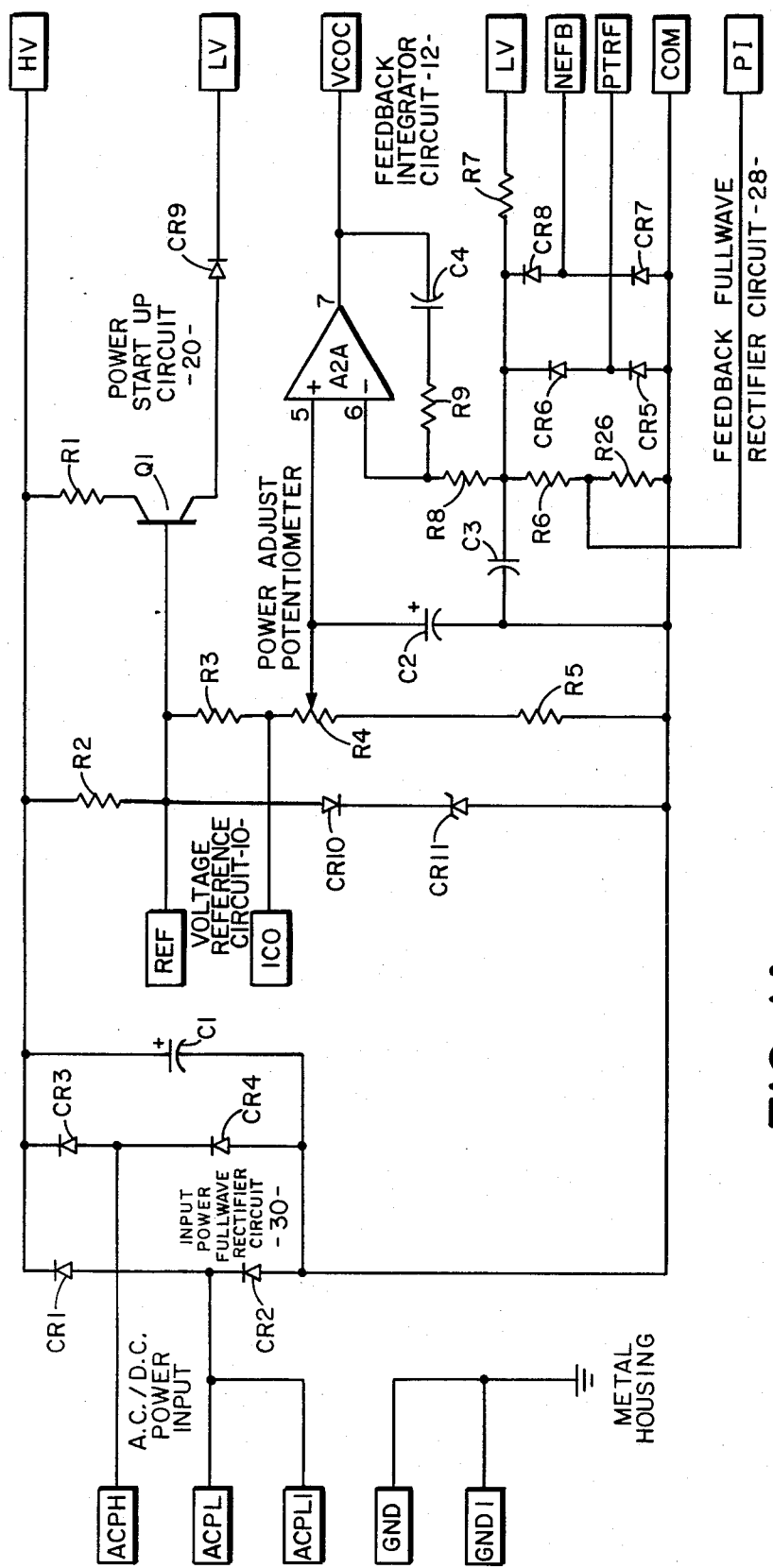

The solid state power supply and light emission controller of the present invention is made up of eleven individual circuits to be described in conjunction with FIGS. 1A-1D. These circuits include a voltage reference circuit 10 (FIG. 1A); a feedback integrator circuit 12 (FIG. 1A); a voltage controlled repetition rate pulse generator circuit 14 FIG. 1B); a power amplifier stage 16 (FIG. 1B); a power amplifier driver stage 16 (FIG. 1B); a power output stage 18 (FIG. 1B); a power start-up circuit with automatic cut-off 20 (FIG. 1B); a low line voltage detection cut-out circuit 22 (FIG. 1C); a temperature controller circuit 24 (FIG. 1C); a ground fault detector circuit 26 (FIG. 1D); a feedback full-wave rectifier circuit 28 (FIG. 1B); and an input full-wave rectifier circuit 30 (FIG. 1A).

The input power unregulated full-wave rectifier circuit 30 (FIG. 1A) serves to rectify alternating current power of 200 watts maximum and of a frequency from 40 Hz-500 Hz. The power factor of rectifier circuit 30 is greater than 90°. The full-wave rectifier circuit 30 is connected across the input terminals (ACPH) and (ACPL) which in turn are connected to the usual alternating current line voltage or direct current power source. The line voltage may vary, for example, from 90 volts to 140 volts, and, as noted, its frequency may extend from 40 Hz to 500 Hz, or it may be direct current. The full-wave rectifier circuit 30 includes four diodes designated CR1, CR2, CR3 and CR4, each of which may be of the type designated IN4004. The full-wave rectifier circuit 30 is connected to a high positive voltage lead designated (HV) and to system ground designated (COM). The voltage on lead HV is from +120 V-+180 V D.C. A capacitor C1 which may have a capacity of 60 microfarads is connected across the full-wave rectifier circuit 30, as shown.

The high voltage lead (HV) is connected to a 39 kilo-ohm resistor R2 which, in turn, is connected to ground through a diode CR10 and through a Zener diode CR11. Diode CR10 may be of the type designated IN914, and the Zener diode may be of the type designated IN753A. The junction between resistor R2 and diode CR10 is connected to the base of an NPN transistor Q1 which may be of the type designated 2N6558. The circuitry of transistor Q1 constitutes the power start-up circuit 20 which supplies power to the circuitry of the system until the system becomes fully operational. The start-up circuit 20 includes an automatic cut-off diode CR9 which may be of the type designated IN4004.

The collector of transistor Q1 is connected to the positive voltage lead (HV) through a resistor R1 which may have a value of 1.5 kilo-ohms. The emitter of transistor Q1 is connected to a diode CR9 which may be of the type designated IN4004. The diode CR9 is connected to a low positive voltage lead (LV), and a voltage of the order of +7 volts to +12 volts DC appears on low voltage lead (LV).

The junction of resistor R2 and diode CR10 is also connected through a 30 kilo-ohm resistor R3 to a 10 kilo-ohm potentiometer R4, and through a 5.1 kilo-ohm resistor R5 to ground. The wiper of potentiometer R4 is connected to the non-inverting input of a differential amplifier A2A, which may be one-half of an integrated circuit of the type designated LM392. The wiper of potentiometer R4 is also connected to a grounded 0.1 microfarad capacitor C2. The inverting input of amplifier A2A is connected to a 22 kilo-ohm resistor R8 which, in turn, is connected to the cathodes of diodes CR6 and CR8. These diodes, together with further diodes CR5 and CR7 may be of the type designated IN914. The inverting input of amplifier A2A is also connected to a resistor R9 which may have a value of 100 ohms. Resistor R9 is connected to a capacitor C4 which may have a capacity of 0.01 microfarads, and which is connected to the output of amplifier A2A. The circuitry of amplifier A2A constitutes the feedback integrator circuit 12.

The output of amplifier A2A designated (VCOC) is also connected through a 4.7 kilo-ohm resistor R10 (FIG. 1B) to the inverting input of a second operational amplifier A2B (FIG. 1B), which may be formed by the second half of the integrated circuit designated LM392. The positive input of amplifier A2B is connected through a 30 kilo-ohm resistor R12 to lead (LV), and is also connected to a grounded 30 kilo-ohm resistor R11 and to a 100 kilo-ohm resistor R13. Resistor R13 is connected to the output of amplifier A2B. The non-inverting input of amplifier A2B is also connected to a 150 picofarad capacitor C5 which, in turn, is connected to the inverting input of amplifier A2B. A grounded 0.01 microfarad capacitor C6 is connected to the inverting input of amplifier A2B. The inverting input is also connected through a 510 ohm resistor R14 and through a diode CR12 and a 200 ohm potentiometer R15 to the output of amplifier A2B. Amplifier A2B is connected as the voltage controlled repetition rate pulse generator circuit 14.

The output of pulse generator 14 is connected to a 510 ohm resistor R16 which, in turn, is connected to the base of a PNP transistor Q2 which may be of the type designated MJE701T. The base of transistor Q2 is connected to lead (LV) through a 510 ohm resistor R17, and the emitter is directly connected to lead (LV). The transistor Q2 is connected to form the power amplifier driver stage 16.

The collector of transistor Q2 is connected to one side of the primary winding of a transformer T1, while the other side of the primary is grounded. The collector is also connected to a 5.1 ohm resistor R23 which, in turn, is connected to a grounded 0.1 microfarad capacitor C7. The collector of transistor Q2 is also connected to a grounded 30 ohm resistor R24. One side of the secondary winding of transformer T1 is grounded, and the other side is connected through a 1 ohm resistor R25 to the base of an NPN transistor Q3 which may be of the type designated BU205. Resistor R24 is connected across the primary winding of transformer T1. A 0.1 microfarad capacitor C8 is connected to the base of transistor Q3 and to ground. A 0.1 microfarad capacitor C10 is connected between the high voltage lead (HV) and ground.

The primary of transformer T1 has 30 turns and the secondary has 15 turns. The collector of transistor Q3 is connected to a 0.020 microfarad capacitor C9 which, in turn, is connected to the cathode of a diode CR14 and to the anode of a diode CR15. The anode of diode CR14 is grounded, and the cathode of diode CR15 is connected to the positive high voltage lead (HV). The diodes may be of the type designated MR854. The collector of transistor Q3 is also connected to one side of the primary winding T2P of a flyback transformer T2, while the other side of this winding is connected to the positive high voltage lead (HV). The circuit of capacitor C9, diode CR14 and diode CR15 limits the flyback voltage swing of the flyback transformer T2 and acts as an efficient snubber for transistor Q3. The only power loss is in the diodes CR14, CR15 and in the internal resistance of capacitor C9.

A 5-turn secondary winding LP of transformer T2 is utilized for developing the low voltage on lead (LV). The voltage appearing across the winding LP is rectified by a diode CR16 of the type designated MR854, and is filtered by a 220 microfarad grounded capacitor C11. One side of winding LP is also grounded. It should be noted that winding LP is wound on the primary side of transformer T2. Both sides of a secondary winding T2S1 of transformer T2 are connected to a cold cathode luminous tube 100. The primary winding T2P of transformer T2 may have 70 turns. The secondary winding T2S1 may have 1500 turns, and may be lattice wound. The core of transformer T2 is preferably a ferro cube with an air gap of 0.005 inches in each leg.

A third 5-turn low voltage primary feedback winding (PFB) is placed on the primary side of the core of transformer T2 and a 7-turn secondary winding SFB is connected in series with winding PFB. These windings provide voltage feedback for the circuitry of FIG. 1A. The windings are connected through 6.8 kilo-ohm voltage dropping resistor R45 to terminals designated NEFB and PTRF. These terminals are connected respectively to the anodes of diodes CR6 and CR8 of the feedback full-wave rectifier circuit 28 of FIG. 1A, and to the cathodes of diodes CR5 and CR7, whose anodes are grounded. The rectifier circuit 28 is shunted by a 1.5 kilo-ohm resistor R6 and a 5.1 ohm resistor R26, resistor R6 being connected to resistor R8, and to a 0.01 microfarad grounded capacitor C3. The cathodes of diodes CR6 and CR7 are connected to the low voltage lead (LV) through a 100 kilo-ohm resistor R7.

The voltage across the winding PFB is added to and is in phase with the voltage across the winding SFB. The PFB winding is tightly coupled to the supply voltage causing the power to the luminous tube load to be held constant for variations of line voltage. Thus a constant light output is achieved even though the line varies.

The SFB winding is tightly coupled to the voltage applied to the luminous tube 100, and it changes power as required to compensate for reflected luminous tube load variations. This compensation is very useful for luminous tubes employing mercury as it is well known that reasonable light output is only obtained when the mercury is heated sufficiently to become vaporized. Since the degree of vaporization directly influences the luminous tube load, detection of the reflected luminous tube load provides the needed control path. The SFB winding reflects any change in the luminous tube load and by way of control circuits to be described increases the power to the luminous tube so that when mercury is employed, the temperature is raised to the proper operating level.

The transformer T2 is constructed with loose primary to secondary coupling to provide the operation described above, as well as to exhibit the characteristics normal to a flyback transformer, and to provide protection against accidental short-circuiting of the secondary winding.

As the temperature of the luminous tube 100 decreases below a point such that the control circuit connected to the SFB winding is incapable of correcting the cold temperature problem, the temperature control circuit 24 of FIG. 1C is provided to increase the power to the luminous tube. The temperature control circuit 24 includes differential amplifiers A3A and A3B, each of which may be one-half of an integrated circuit of the type designated LM392. A diode CR17 of the type designated IN914 is utilized as a temperature detector. Diode CR17 is connected through a 5.1 kilo-ohm resistor R28 to a reference lead (REF) and is also connected to a 5.1 kilo-ohm grounded resistor R27.

The voltage across diode CR17 is monitored by the inverting input of differential amplifier A3A. The diode CR17 decreases its voltage about 2 millivolts per degree centigrade as the temperature increases. The temperature level may be set by adjusting a 2 kilo-ohm potentiometer R13 which, in turn, applies a reference voltage to the noninverting input of amplifier A3A. Potentiometer R13 is connected through a 2 kilo-ohm resistor R29 to the reference lead (REF) and it is also connected to a 2 kilo-ohm grounded resistor R13. The wiper of potentiometer R13 is connected to a grounded 0.1 microfarad capacitor C13. The output of amplifier A3A is coupled back to its non-inverting input through a 0.1 microfarad capacitor C12.

Differential amplifier A3A of FIG. 1C is connected to the non-inverting input of differential amplifier A3B, and the wiper of potentiometer R13 is connected to the inverting input of the amplifier A3B. The output of amplifier A3B is designated PI, and it is connected to the junction of resistors R6 and R26 in the feedback integrator circuit 12 of FIG. 1A.

The voltage across diode of FIG. 1C CR17 is applied to the inverting input of amplifier A3B. As the temperature decreases, the voltage increases above the reference voltage applied to the non-inverting input of amplifier A3A. When that occurs, the output of amplifier A3A transfers from a logic "1" to a logic "0". The output of amplifier A3A controls the output of amplifier A3B. Whenever the output of amplifier A3A is a logic "0", the output of amplifier A3B is also a logic "0". Whenever the output of amplifier A3B (PI) is a logic "0", resistor R26 of FIG. 1A is shorted out of the feedback circuit of amplifier A2A. This diminishes the feedback voltage to the amplifier A2A, and therefore, the A2A amplifier circuit increases the control output power (VCOC) until the proper feedback voltage is once again established at the level that existed before resistor R26 was shorted out. As described above, the output VCOC is applied to the voltage controlled repetition rate pulse generator 14 of FIG. 1B.

The low line voltage detection circuit 22 is shown in FIG. 1C. This circuit includes a pair of differential amplifiers designated A1A and A1B, both of which may comprise an integrated circuit of the type designated LM392. The non-inverting input of amplifier A1A is connected to the junction of a 470 kilo-ohm resistor R18 and 12 kilo-ohm resistor R19. Resistor R18 is connected to the high voltage lead HV, and resistor R19 is connected to systems ground. The non-inverting input of amplifier A1A is connected to the junction of a 10 kilo-ohm resistor R20 and 10 kilo-ohm resistor R21. The resistor R20 is connected to the reference voltage lead REF, and the resistor R21 is connected to systems ground.

The non-inverting input of amplifier A1A is further connected to the inverting input of amplifier A1B. The junction of resistors R18 and R19 is connected through a 100 kilo-ohm resistor R22 to the non-inverting input of amplifier A1B. The output of amplifier A1B is connected to the cut-out lead ICO.

The amplifiers A1A and A1B operate as comparators. During the normal operation of the system, the output from amplifier A1B on lead ICO is high, permitting normal operation of the feedback integrator circuit 12 of FIG. 1A. However, should the line voltage drop below a certain predetermined minimum, the output of amplifier A1B falls to systems ground level, preventing the operation of the feedback integrator circuit 12 of FIG. 1A, and causing the overall system to stop operating. This circuit assures that the luminous tube 100 of FIG. 1B will be de-energized in the event the line voltage drops below a certain predetermined level.

It is usual practice to mount the power supply and light emission controller and the luminous tube 100 in a metal housing. Because of the high operating frequency of the system and the possible physical proximity of the tube 100 to the metal housing, the absence of a ground connection may result in a voltage being developed on the housing of such magnitude as to represent an electrical shock hazard. The low voltage, low current ground fault detector circuit of FIG. 1D is included in the system to assure that the system cannot be energized without a ground being connected to the metal housing. The ground fault detector circuit inhibits or shuts down the operation of the power supply and light emission controller system if it is determined that the low side of the A.C. line input (ACPL) (FIG. 1A) and the input GND (earth ground input) are not connected together at some remote connection. Such a fault would most commonly be caused by a lack of connection to the (GND) input.

The ground fault detector circuit 26 of FIG. 1D has input leads GNDI and ACPLI which are respectively connected to the ground lead GND and ACPL lead (FIG. 1A). Lead GND1 is connected to a full-wave rectifier formed in FIG. 1D of four diodes CR18, CR19, CR18A and CR19A, each of which may be of the type designated IN914. A Zener diode CR20 of the type designated SE10 and a 5 ohm resistor R39 are connected across the leads GNDI and ACPLI. The lead ACPLI is connected through resistor R39 and through an optical isolator A4 to the full-wave rectifier. Optical isolator A4 may be of the type designated OPI2252. The optical isolator is connected to the low voltage lead LV through a 10 kilo-ohm resistor R38, and is connected through a 10 kilo-ohm resistor R36 to the base of an NPN transistor Q5 of the type designated 2N3904. The emitter of the transistor Q5 is connected to the system ground lead COM, and its collector is connected to lead ICO. The optical isolator is also connected to the system ground lead through a 2.2 megohm resistor R46.

The ground fault detector of FIG. 1D includes a free-running Colpitts oscillator formed by the circuitry of an NPN transistor Q4 of the type designated 2N3904. The collector of the transistor is connected to the primary of a transformer T3, the secondary of which is connected to the full-wave rectifier. The low voltage lead (LV) is connected to one side of the primary of transformer T3, and through a 5.1 kilo-ohm resistor R32 to the base of transistor Q4 which, in turn, is connected to a 5.1 kilo-ohm grounded resistor R33 and to a 0.1 microfarad grounded capacitor C15. The emitter of transistor Q4 is connected to a 100 ohm grounded resistor R34 and to a 0.047 microfarad grounded capacitor C36. A 0.1 microfarad capacitor C14 is connected between the LV lead and system ground. The free-running oscillator circuit of the ground fault detector 26 is isolated from the power inputs ACPLI and GNDI by transformer T3 and optical isolator A4.

The secondary of the transformer T3 outputs an alternating current signal to terminals ACPL1 and GND1 which in turn are connected to power inputs ACPL and GND (FIG. 1A) respectively. The diodes CR18, CR18A, CR19 and CR19A rectify the alternating current signal. When the power inputs ACPL and GND are connected together, the output current from diodes CR18 and CR18A flows from lead GND1 to lead ACPL1, and through resistor R39 and optical coupler A4 back to the rectifier diodes CR19 and CR19A. This current flow causes the transistor Q5 to be nonconductive, thus allowing the power supply and light emission controller system to operate normally. If insufficient current flows through optical isolator A4, such as would exist if the power inputs GND and ACPL of FIG. 1A were not connected together, the resulting lack of flow of current through the optical isolator I4 would cause transistor Q5 to be rendered conductive, thereby drawing the voltage on lead ICO down to system ground level (COM), and thereby inhibiting the operation of the circuitry of FIG. 1A.

The voltage on lead ICO is also drawn down to system ground to inhibit the operation of the circuitry of FIG. 1A, by the operation of the low line voltage detection circuit 22 of FIG. 1C. In that circuit, should the line voltage drop below a particular level with respect to the reference voltage REF, differential amplifier A1A causes the output of differential amplifier A1B to drop to system ground level (COM). The low line voltage detection circuit is important because at lower voltages the luminous tube 100 changes color, and this can prove to be dangerous when it is used, for example, in a traffic signal.

The circuit of FIG. 1D is protected from voltage surges across the leads GND1 and ACPL1 due, for example, to lightning, by the circuitry composed of the Zener diode CR20 and resistor R39.

The power start-up circuit 20 of FIG. 1A supplies power to the light emission controller drive logic when the system is first turned on. The transistor Q1, diode CR9 and resistor R1 comprise the power start-up circuit components. Transistor Q1 is connected as an emitter follower, and when power is first applied to the circuit, current flows through the emitter follower which results in a voltage being developed on lead LV. This voltage, as described above, is of the order of 5 volts D.C. The voltage is limited by the Zener diode by resistor R2, diode CR10 and Zener diode CR11 of FIG. 1A which form the voltage reference circuit 10.

As the system becomes operational, the voltage level feedback through diode CR9 becomes greater than the set voltage regulation point of transistor Q1, and the transistor becomes back-biased so as to cut off the start-up voltage on lead LV. The current through resistor R2 from the unregulated full-wave rectifier circuit 30 supplies current for the operation of Zener diode CR11. The voltage reference circuit 10 supplies reference voltages for the start-up circuit and for the feedback rectifier.

Figure 1B:
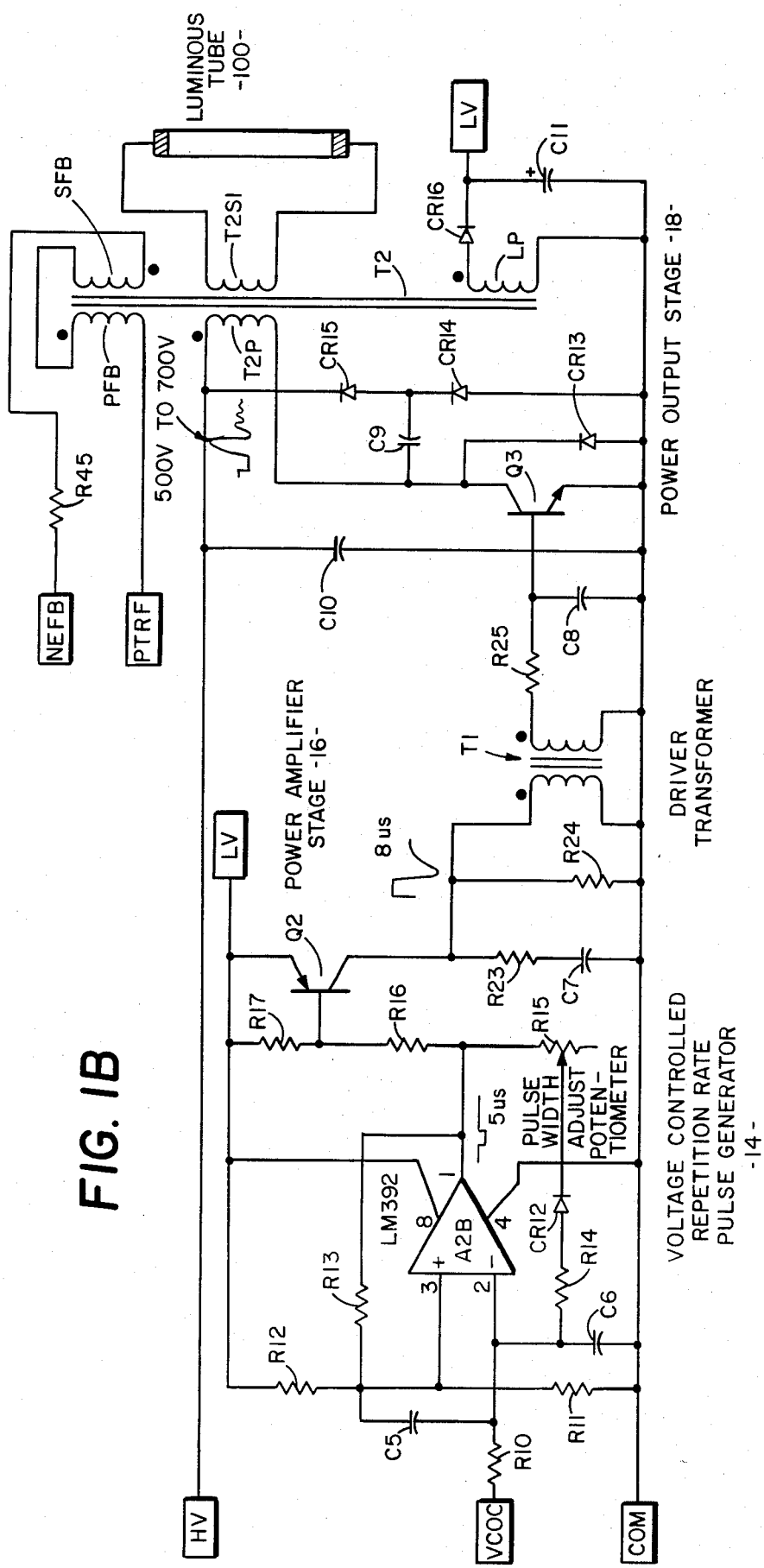
Figure 1D:
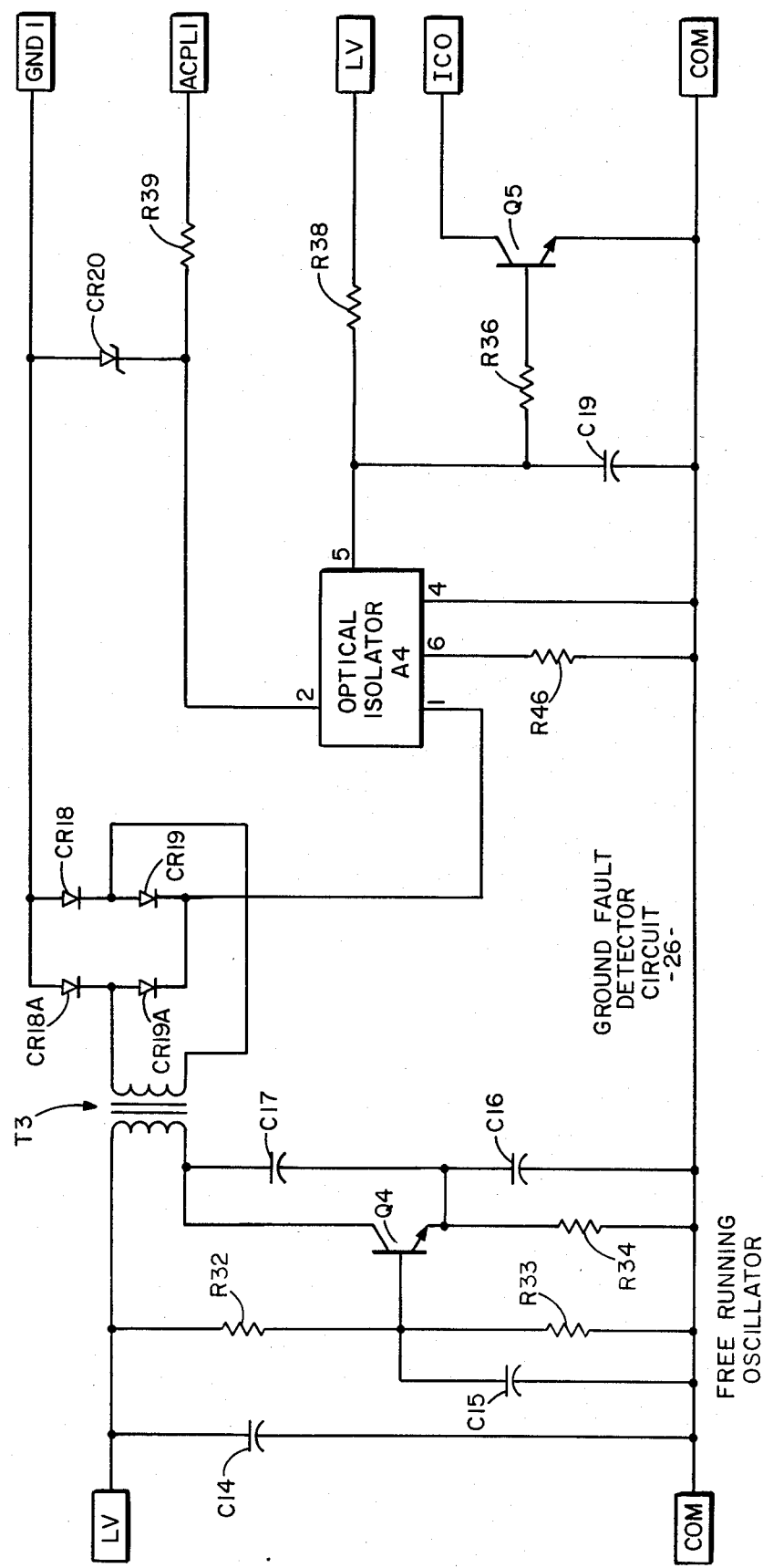

The resistors R6 and R26 of FIG. 1A, the diodes CR5, CR6, CR7 and CR8, and the resistor R45 of FIG. 1B form the feedback full-wave rectifier circuit 26. The feedback voltage appearing across the leads NEFB and PTRF is full-wave rectified by the diodes CR5, CR6, CR7 and CR8. The rectified voltage is applied across resistors R6 and R26, the junction of which is connected to lead PI.

The feedback integrator circuit 12 performs a comparison between the voltage existing at the wiper of potentiometer R4 in FIG. 1A and the full-wave rectified voltage developed by the feedback rectifier circuit 28. The difference voltage is integrated, and the feedback integrator circuit 12 develops a control voltage by way of lead VCOC through resistor R10 of FIG. 1B to control the frequency of the voltage controlled repetition rate pulse generator 14. The resistors R8, R9, capacitors C3, C4, differential amplifiers A2A, capacitor C2 and potentiometer R4 of FIG. 1A comprise the components of the feedback integrator circuit 12.

The voltage controlled repetition rate pulse generator 14 of FIG. 1B generates negative-going asymmetrical pulses with a repetiton rate from 1 KHz to 30 KHz. The repetition rate of the pulses is controlled by the voltage applied by lead VCOC to resistor R10. The resistors R10, R11, R12, R14; potentiometer R15; diode CR12; capacitors C6, C5; and differential amplifier A2B comprise the components of the voltage controlled repetition rate pulse generator.

The resistors R16, R17, R23 and R24; the transistor Q12; the capacitors C7, C8; and transformer T1 of FIG. 1B are the components which make up the power amplifier driver stage 16. The driver stage receives negative-going pulses from the voltage controlled pulse generator 14 and develops pulses which control the state of the power output stage 18. The driver supplies a positive pulse to the power output transistor Q3 in response to turn-on commands, and stores energy so that whenever the positive pulse is removed, the stored energy causes a large magnetic inductive negative pulse to exist on the base of the power transistor. The large negative inductive power pulse applied to the base of the power transistor causes the power transistor to turn off at a faster rate, thus saving power.

Transistor Q3; resistor 25; capacitor C9; diodes CR13, CR14 and CR15; and transformer T2 of FIG. 1B comprise the components of the power output stage 18 of FIG. 1B. Transistor Q3 is a solid state power output switch which can switch 2.5 amperes peak current and exhibits 1500 volts peak collector-emitter breakdown. The capacitor C9 and diodes CR14 and CR15 form a damping network that suppresses undesirable voltage amplitude spikes. Transformer T2 supplies power for the driver logic circuits, reflected line voltage, reflected luminous tube load, and it also supplies power for the luminous tube 100.

As stated above, the power start-up circuit 20 of FIG. 1A supplies power to the circuitry of the power supply and controller when the system is first turned on. At that time, emitter follower transistor Q1 of FIG. 1A becomes conductive as bias current flows through resistor R2 and through the base-emitter of transistor Q1. The voltage level of the bias current is clamped to the voltage potential of diodes CR10 and CR11. Transistor Q1 is rendered conductive and current flows through resistor R1, transistor Q1 and diode CR9 applying voltage lead LV of a magnitude of 5 volts D.C. Lead LV applies power to transistor Q2 of FIG. 1B to initiate the operation of the system. The output power stage Q3 becomes operational and transformer T2 develops regenerative feedback power through its winding LP and diode CR16 for continued energization of the system. The regenerative feedback logic voltage applied to lead LV is approximately 9 volts D.C. This voltage on lead LV back-biases the diode CR9 of FIG. 1A and renders the start-up transistor Q1 non-conductive during the normal operation of the system.

The Zener diode CR11 in the voltage reference circuit 10 of FIG. 1A breaks down at a particular voltage to limit the maximum reference voltage appearing across potentiometer R4, as derived from the unregulated input power full-wave rectifier circuit 30. The inverter cut-out (ICO) is applied to the junction of resistor R3 and potentiometer R4. Current through resistor R3 establishes the correct reference voltage for the system. All output commands going to the system enter the circuit logic at this point. A logic "0" at the junction of resistor R3 and potentiometer R4 inhibits the overall system from operating.

A direct current voltage appears across resistors R6 and R26 in the feedback rectifier circuit 28 of FIG. 1A which is proportional to the alternating current reflected back through the winding SFB of transformer T2 in FIG. 1B, and which is related to current flow through the tube 100. The rectifiers CR5, CR6, CR7 and CR8 of the full-wave rectifier circuit 28 in FIG. 1A rectify the feedback reflected voltage of the feedback windings PFB and SFB of the transformer T2, and they apply the resulting positive full-wave rectified voltage to the inverting input of differential amplifier A2A in the feedback integrator circuit 12 of FIG. 1A.

The feedback integrator circuit, as explained above, compares the voltage at the wiper of potentiometer R4 with the voltage at its inverting input, and integrates the difference to develop a control voltage (VCOC) for the voltage controlled pulse generator 14 of FIG. 1B. Thus, the repetition rate of the output pulses from the voltage controlled repetition rate pulse generator 14, which controls the firing of the solid state switch formed by transistor Q3 (FIG. 1B) is controlled by the feedback integrator circuit 12.

The feedback integrator circuit 12 of FIG. 1A controls the voltage controlled oscillator to cause a ramp of current to be stored within the flyback transformer T2 for each pulse and transfers this current pulse to the tube 100 each time that the pulse ceases to exist. Therefore, any tendency for the current through the tube 100 to change at a particular line voltage level causes a corresponding change in the frequency of the voltage controlled pulse generator 14 of FIG. 1B to maintain constant light output of the luminous tube 100.

The output pulses from the voltage controlled pulse generator 14 of FIG. 1B are applied through transformer T1 to the power output stage 18 to control the rate of operation of the solid state switch formed by transistor Q3, and thereby to control the power supplied to the luminous tube 100. Transformer T1 converts the high voltage low current pulses from the power amplifier stage 16 into low voltage high current pulses for the switching transistor Q3.

The invention provides, therefore, an improved regulated solid state power supply system for a cold cathode luminous tube. The power supply and light emission control system of the invention is light and efficient, and is relatively inexpensive in its construction. The system of the invention is capable of maintaining essentially constant light output for a cold cathode luminous tube through a wide range of both line voltage and ambient temperature variations.

It will be appreciated that while a particular embodiment of the invention has been shown and described, modifications may be made, and it is intended in the following claims to cover all modifications which come within the true spirit and scope of the invention.

What is claimed is:

1. A regulated solid state power supply system for a cold cathode luminous tube, comprising: a transformer having a primary winding and having a first secondary winding connected to the cold cathode luminous tube; a power input circuit adapted to be connected to an energy source; a switching circuit connecting said power input circuit to the primary winding of said transformer; a voltage controlled repetition rate constant duration pulse generator circuit for producing constant duration pulses at a variable repetition rate; power amplifier driver circuitry connecting the output of the generator circuit to said switching circuit for introducing a constant duration variable repetition frequency pulse signal to said switching circuit alternately to cause energy to flow into the transformer and energy in the transformer to be transferred to the luminous tube in the form of variable frequency constant current pulses; and regulating control circuitry connected to said power input circuit and to said transformer and responsive to the line voltage of said energy source and the current flow in the luminous tube for supplying a regulating voltage to said pulse generator to control the repetition rate of the pulses produced by said generator.

2. The regulated solid state power supply system defined in claim 1, in which said transformer includes further secondary winding, in which said regulating control circuitry includes a differential amplifier, first circuit means connected to said further secondary winding for supplying a first control signal to said differential amplifier proportional to the current flow through the luminous tube, and second circuit means connected to said power input circuit for supplying a second control signal to said differential amplifier which is proportional to the voltage of the energizing source.

3. The regulated solid state power supply system defined in claim 2, in which said further secondary winding includes a first winding section coupled to the primary of the transformer and a second series connected winding section coupled to the secondary of the transformer for causing the regulating control circuitry to regulate the power to the cold cathode luminous tube in the presence of variations in the voltage of the energy source and in the current through the cold cathode tube.

4. The regulated solid state power supply system defined in claim 3, in which said first and second winding sections are loosely coupled to limit reflected short-circuits in the luminous tube load to prevent circuit destruction in the system.

5. The solid state regulated power supply system defined in claim 2, and which includes circuitry responsive to ambient temperature connected to said first circuit means to compensate for changes in the luminous tube load due to extreme ambient temperature conditions.

6. The regulated solid state power supply system defined in claim 1, in which said transformer has a further secondary winding, and circuit means connected to said further secondary winding for supplying an exciting voltage to said voltage controlled pulse producing circuit and to said regulating control circuitry during normal operation of said power supply system.

7. The solid state regulated power supply system defined in claim 6, and which includes start-up circuitry connected to said power input circuit for providing an exciting voltage to said voltage controlled pulse producing circuit and to said regulating control circuitry until the exciting voltage generated by said last-named circuit means exceeds a particular voltage level.

8. The solid state regulated power supply system defined in claim 1, in which the system and cold cathode tube are enclosed in a metallic housing, and which includes ground fault detector circuitry connected to said regulating control circuitry to prevent circuit operation when the metallic housing is not grounded.

9. The solid state regulated power supply system defined in claim 1, and which includes a voltage detector circuit connected to said regulating control circuitry and to said power input circuit for causing the luminous tube to be de-energized when the voltage of the energy source falls below a predetermined level.

* * * * *